United States Patent
Roussel et al.

(10) Patent No.: US 10,750,669 B2
(45) Date of Patent: Aug. 25, 2020

(54) ROUND BALER, COMBINATION OF AN AGRICULTURAL VEHICLE WITH SUCH A BALER AND METHOD FOR FORMING ROUND BALES

(71) Applicant: Deere & Company, Moline, IL (US)

(72) Inventors: David Roussel, Saint Seine en Bache (FR); Jean-Alexis Mercier, Chatelperron (FR); Stéphane Biziorek, Gray la Ville (FR)

(73) Assignee: DEERE & COMPANY, Moline, IL (US)

(*) Notice: Subject to any disclaimer, the term of this patent is extended or adjusted under 35 U.S.C. 154(b) by 238 days.

(21) Appl. No.: 15/793,414

(22) Filed: Oct. 25, 2017

(65) Prior Publication Data
US 2018/0110185 A1 Apr. 26, 2018

(30) Foreign Application Priority Data
Oct. 26, 2016 (DE) .................. 10 2016 221 104

(51) Int. Cl.
*A01F 15/07* (2006.01)
*A01F 15/08* (2006.01)
*A01B 69/04* (2006.01)

(52) U.S. Cl.
CPC ............ *A01F 15/07* (2013.01); *A01B 69/008* (2013.01); *A01F 15/0833* (2013.01); *A01F 15/071* (2013.01); *A01F 2015/077* (2013.01); *A01F 2015/0795* (2013.01)

(58) Field of Classification Search
CPC ............... A01F 15/071; A01F 15/0883; A01F 2015/077; A01F 2015/0795
USPC .................. 56/341; 100/87, 88; 198/810.03; 242/535.1, 548, 548.1, 615, 615.2
See application file for complete search history.

(56) References Cited

U.S. PATENT DOCUMENTS

| | | | | |
|---|---|---|---|---|
| 3,927,814 A | * | 12/1975 | Holm ...................... | B65G 39/16 242/615.2 |
| 3,981,391 A | * | 9/1976 | Phillips .................... | A01F 15/07 198/840 |
| 4,092,914 A | * | 6/1978 | Burrough ................ | A01F 15/07 100/88 |
| 4,224,867 A | * | 9/1980 | Gaeddert ............ | A01F 15/0833 100/88 |
| 4,397,538 A | * | 8/1983 | Castelli .................. | B65H 23/02 198/806 |
| 4,527,686 A | * | 7/1985 | Satoh ...................... | B65G 39/16 198/807 |

(Continued)

FOREIGN PATENT DOCUMENTS

| | | |
|---|---|---|
| DE | 10241215 A1 | 3/2004 |
| DE | 19851470 A1 | 5/2005 |

(Continued)

*Primary Examiner* — Adam J Eiseman
*Assistant Examiner* — Stephen Floyd London

(57) ABSTRACT

A round baler includes a variable bale chamber delimited by side walls arranged on a right and a left in a forward direction of travel, at least one forming belt circulating between the side walls, and at least one sensor for detecting a change of position of the forming belt in the direction of one of the side walls, the at least one sensor being directly or indirectly in operative connection with the forming belt.

8 Claims, 12 Drawing Sheets

(56) References Cited

U.S. PATENT DOCUMENTS

| | | | |
|---|---|---|---|
| 4,686,820 A * | 8/1987 | Andra | A01F 15/0833 100/88 |
| 4,702,066 A | 10/1987 | Newendorp et al. | |
| 4,776,153 A * | 10/1988 | DePauw | A01D 41/145 56/10.2 E |
| 4,924,405 A * | 5/1990 | Strosser | A01F 15/0833 100/4 |
| 4,959,040 A * | 9/1990 | Gardner | B65G 39/16 198/807 |
| 5,182,987 A | 2/1993 | Viaud | |
| 5,615,544 A * | 4/1997 | Berger | A01F 15/0833 100/88 |
| H1819 H * | 12/1999 | Anderson et al. | 56/341 |
| 6,874,412 B1 * | 4/2005 | Glaszcz | A01F 15/0833 100/47 |
| 8,516,957 B1 * | 8/2013 | Merritt | B30B 9/3082 100/88 |
| 2006/0048654 A1 | 3/2006 | Biziorek | |
| 2008/0087177 A1 * | 4/2008 | Olander | A01F 15/0833 100/5 |
| 2009/0049817 A1 * | 2/2009 | Viaud | A01F 15/0833 56/10.2 R |
| 2010/0288140 A1 * | 11/2010 | Smith | A01F 15/0715 100/5 |
| 2010/0318253 A1 * | 12/2010 | Brubaker | A01B 69/008 701/25 |
| 2011/0272250 A1 * | 11/2011 | DeVries | B65G 39/16 198/617 |
| 2012/0152698 A1 | 6/2012 | Viaud | |
| 2013/0032047 A1 | 2/2013 | Marques et al. | |
| 2013/0075235 A1 * | 3/2013 | Maiwald | B65G 39/16 198/806 |
| 2016/0264358 A1 | 9/2016 | Kuiper et al. | |
| 2017/0000037 A1 * | 1/2017 | Reijersen Van Buuren | A01F 15/07 |

FOREIGN PATENT DOCUMENTS

| | | | | |
|---|---|---|---|---|
| DE | 102004042740 A1 | | 3/2006 | |
| DE | 102010002172 A1 * | | 8/2011 | B65G 39/16 |
| DE | 102010030482 A1 | | 12/2011 | |
| DE | 102011003727 A1 | | 8/2012 | |
| DE | 202014003633 U1 | | 7/2015 | |
| EP | 1264531 A1 | | 12/2002 | |
| EP | 1308078 A1 | | 5/2003 | |
| EP | 1397954 A1 | | 3/2004 | |
| FR | 3021492 A1 | | 12/2015 | |
| IE | 2015/0125 A1 | | 2/2016 | |

* cited by examiner

ROUND BALER, COMBINATION OF AN AGRICULTURAL VEHICLE WITH SUCH A BALER AND METHOD FOR FORMING ROUND BALES

RELATED APPLICATIONS

This application claims priority to German Application Ser. No. 102016221104.8, filed Oct. 26, 2016, the disclosure of which is hereby expressly incorporated by reference in its entirety.

FIELD OF THE DISCLOSURE

The present disclosure relates to a round baler, and in particular a round baler with a variable baling chamber delimited by side walls disposed on the right and the left in the forward direction of travel and at least one forming belt running between the side walls.

BACKGROUND

Round balers for compaction of an agricultural crop are known. Among others, there are balers in use that have variable bale chambers in which one or more moving forming belts guided over rollers delimit a bale chamber in the circumferential direction of a round bale that is to be formed. Right and left side walls of the round baler delimit the bale chamber in the forward direction of travel on the side, or face, of a cylindrical round bale that is to be formed.

In general, round balers are towed by a towing vehicle, for example, an agricultural tractor, over a swath of cut or mown crop laid on the ground, where a pickup and feed unit on the round baler picks up the crop and transports it to the bale chamber. A cylindrical bale forms with increasing crop feed. It is disadvantageous that frequently the forming belt or belts wander or drift laterally with respect to their circumferential direction, so that for one asymmetric bales can result, and for another the forming belts can rub or drag along at the side walls and unnecessarily wear. A lateral drift is, as a rule, caused by crop that is not uniformly delivered over the width of the round baler. This may be because the swath laid on the ground is unevenly piled up, or the round baler is not guided over the middle of the swath. Thus, more crop is fed to the bale chamber on one side of the baler than on the other side, which unevenly tensions the forming belt or belts over the width of the bale chamber. This ultimately gives rise to a lateral wandering or drifting of the forming belt and in the worst case lets the belt reach the side wall, at which it then drags along, which should be prevented. A driver of the vehicle may prevent this by guiding the baler appropriately evenly over the swath so that a crop feed uniformly distributed over the width of the round baler takes place. However, this is difficult because the driver lacks information about the uniformity of the delivered amount of crop.

Thus, there is a need for a round baler designed with which crop feed that is as uniform as possible can take place, so that cylindrical bales can be uniformly formed and the wear of a forming belt can be reduced.

SUMMARY

In one embodiment of the present disclosure, a round baler may be designed so that at least one sensor for detecting a change of position of the forming belt in the direction of one of the side walls, which interacts directly or indirectly with the forming belt, is provided. Because a change of position of the forming belt is immediately detectable, a reaction to a change of position of the belt can immediately occur. The driver of a vehicle towing the round baler can correspondingly react to a signal provided by the sensor and achieve a uniform delivery of crop. Further, the forming belt can be prevented from running against one of the side walls and being damaged or wearing excessively.

The sensor can interact with an actuation element so that the sensor is in operative connection with the forming belt. Through this, movements and related forces that originate from the forming belt do not act directly on the sensor, but rather are captured or acquired by the actuation element. This improves the robustness and minimize the fragility of such a sensor arrangement.

The sensor can be variously designed and, in each case according to the actuation element, can be matched to the latter. The sensor is designed as an angle sensor or travel sensor. However, embodiments with, for example, optical sensors or even electromagnetic sensors may also be conceivable.

The actuation element can, for example, be brought directly or indirectly into engagement with a circulating edge of the forming belt or be connected to it. Should the forming belt wander or drift to one side, this will act directly on the actuation element which will undergo a deflection or actuation corresponding to the change of position of the forming belt. The deflection or actuation will be detected by the sensor, where the deflection of the actuation element directly indicates the change of position of the forming belt.

The actuation element is mounted on a part of the frame of the round baler, so that the change of position of the forming belt is detected relative to the frame of the round baler or relative to the side walls.

The actuation element can include a guide roller, which rolls on the circulating edge of the forming belt. The guide roller serves, for one thing, as a guide element for the forming belt and, for another, minimizes friction losses between the actuation element and the circulating edge of the forming belt. Alternatively, a kind of guide block or guide shoe, which is in engagement with the circulating edge, is also conceivable. The guide roller or the guide block or guide shoe is provided with a guide slot, in which the circulating edge runs or is captured.

The actuation element can comprise a pivot arm, which is mounted on the frame so that it can pivot, where the guide roller is disposed on a pivotable free end. A corresponding arrangement is also possible in combination with the guide block or guide shoe. The pivot arm is pivotable about a pivot axis at its end that is mounted on the frame, and an angle sensor detects the pivoting movement and through this can detect the change of position of the round baler relative to the frame or relative to the side walls. The pivot angle of the actuation element is directly connected with the change of position of the forming belt in the direction of the side wall or, in other words, the change of position of the forming belt can be derived directly from the pivot angle.

In an alternative embodiment, the actuation element can include a slide that can linearly slide in the direction of the side walls and the guide roller can be disposed at a free end of the slide. The same design is also conceivable with the guide block or guide shoe for guiding the forming belt. The actuation element designed as a slide is affixed on the frame, where the slide is guided in a guide rail or guide slot or can be made in the form of a telescoping rod or the like.

The actuation element is tensioned by a tensioning device acting in the direction of the forming belt, so that the actuation element or the guide roller or the guide block or guide shoe disposed there is pressed against the forming belt or against the circulating edge of the forming belt and is in contact with it.

The actuation element can further be moved or guided against a stop, so that the leeway for movement of the moving element is limited. This also leads to the change of position of the forming belt being limited and can prevent the forming belt from reaching or running up to one of the side walls.

The round baler described above can be operated in combination with an agricultural vehicle. The signal provided by the sensor can be shown to the driver visibly or audibly in an appropriate display device in the vehicle. Thus, the signal can, for example, be represented as a numerical value or as a graph or the driver can be informed via alarm sounds if a change of position of the forming belt occurs.

Further, it is possible that a signal provided by the sensor represents a correction value for a vehicle steering direction, which automatically operates in dependence on the signal. For this, the vehicle can be outfitted with an automatic steering device, as is known today in the realm of steering systems steered by global positioning systems. A signal originating from the sensor can in an automatically operating steering system of a steering unit serve as a control signal and the vehicle is automatically steered so that the swath is optimally covered. As such, a change of position of the forming belt is automatically counteracted and the driver himself no longer need intervene.

A method for forming round bales with a combination of agricultural vehicle and a round baler according to the above embodiments provides that a change of position of the forming belt in the direction of one of the side walls of the round baler is detected by means of at least one sensor that is directly or indirectly in operative interaction with the forming belt, where the signal detected by the sensor is sent to a display device or to an automatic steering device for the vehicle and is processed by it.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
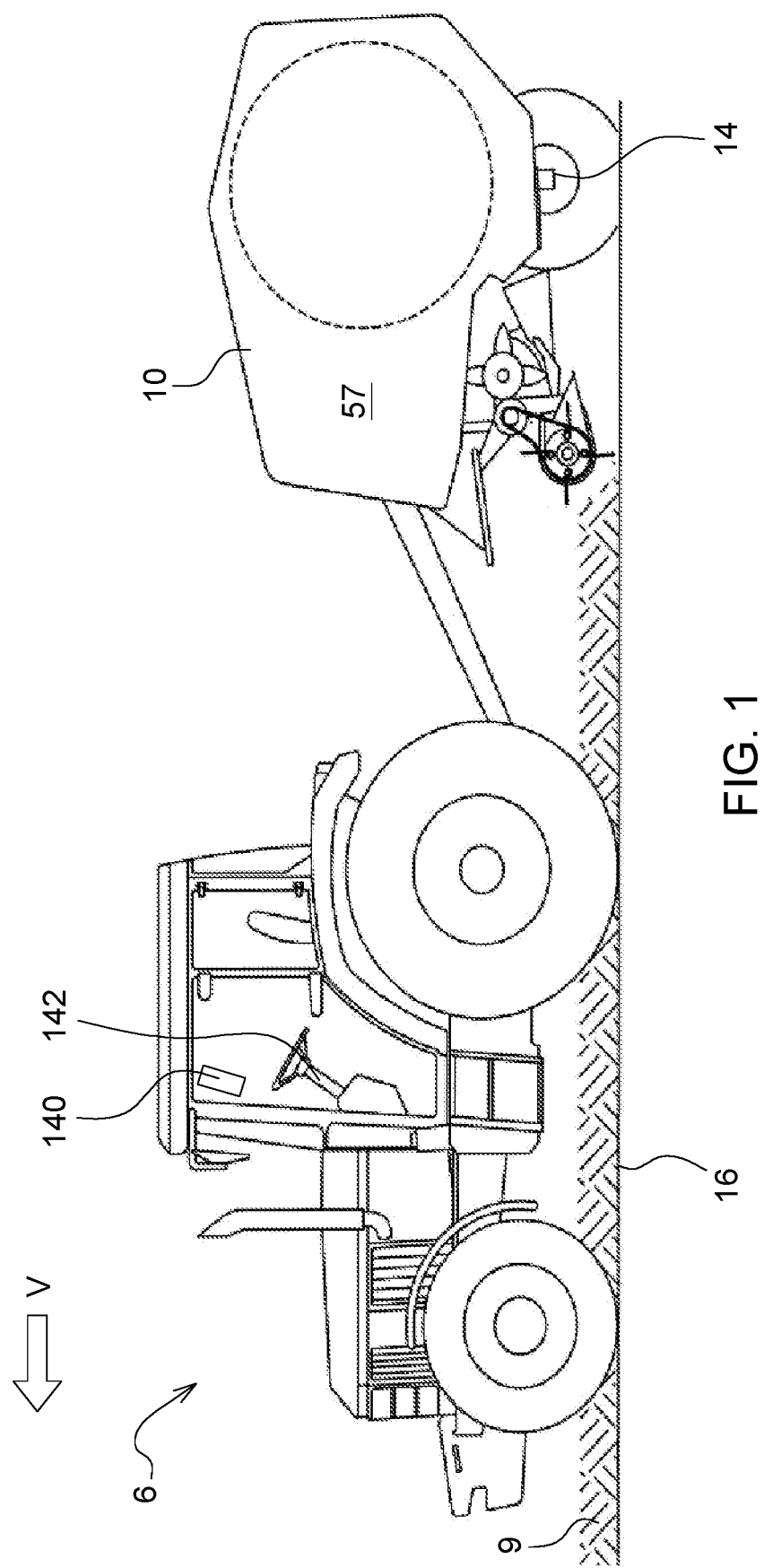
FIG. 1 shows a schematic side view of a combination of an agricultural vehicle and a round baler.

FIG. 1 shows an embodiment of a combination 6 of an agricultural vehicle 8, in the form of a tractor, and a round baler 10, where the round baler 10 picks up crop deposited on the ground 16 in a swath 9 by means of a pickup unit 22.

Figure 2:
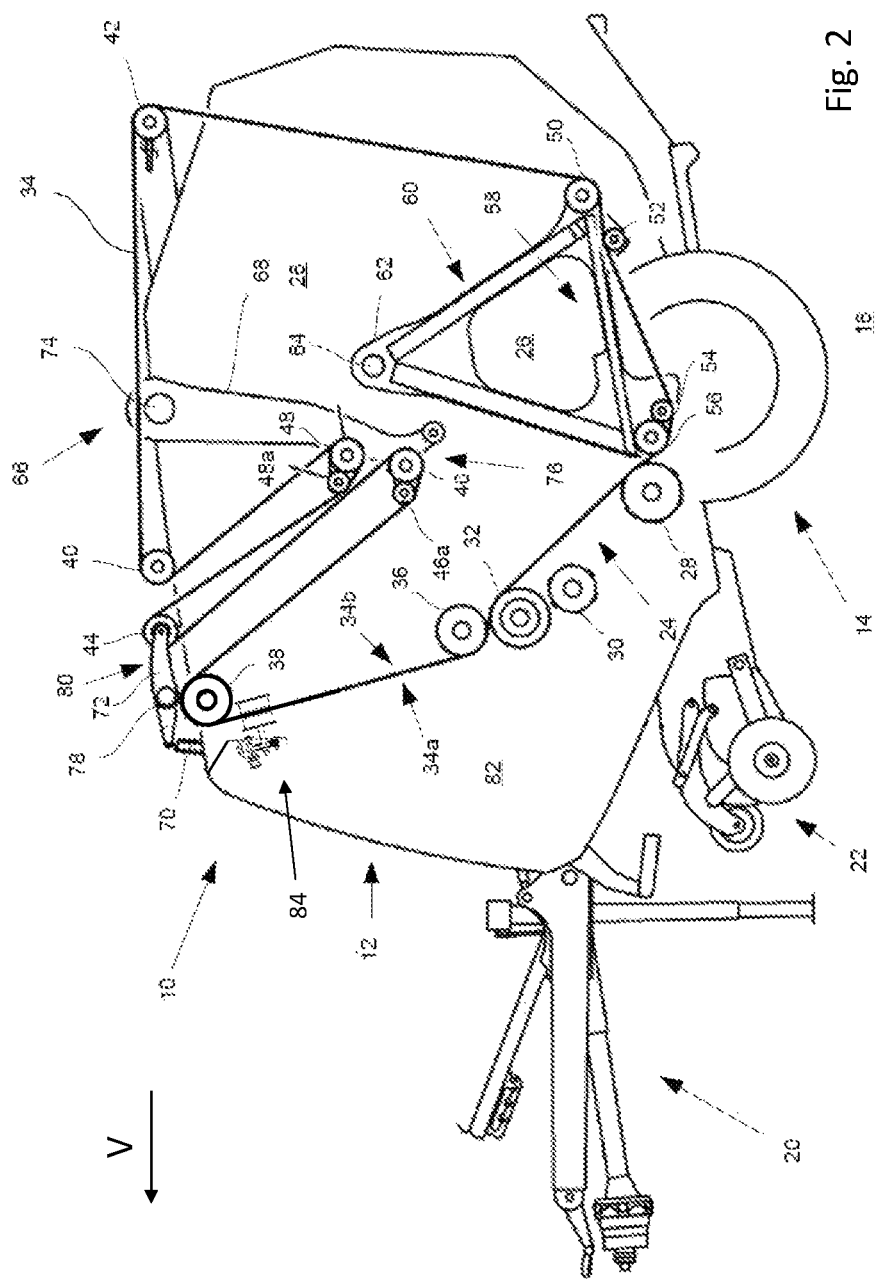
FIG. 2 shows a schematic view of a round baler with the routing of a circulating forming belt and sensor device.

As is pictured in more detail in FIG. 2, the round baler 10 includes a frame 12, which is supported on the ground 16 via a chassis 14. The round baler 10 that is shown is designed as a kind of round baler that can be used in agriculture as well as industry to produce what is usually called a round bale, in particular, a round cylindrical bale, from crop, but also from trash, paper, pulp or fabric, cotton, tobacco, etc. Such a round baler 10 can be towed by the vehicle 8 or can also be self-propelled.

According to this embodiment, a shaft 20 is provided on the side of the frame 12 that is in front in the forward direction of travel (V) in order to hitch the round baler 10 to the vehicle 8 and to tow it over a field. A pickup unit 22 in the form of a "pick-up" serves to pick up crop lying on the ground 16 such as, for example, hay or straw deposited in a swath 9. The crop picked up by the pickup unit 22 is delivered to an inlet 24 of a bale chamber 26 and is rolled up in a spiral into a round cylindrical bale, tied, and then dropped onto the ground 16.

A lower stationary roller 28 and two upper rollers 30, 32 are positioned at the inlet 24 of the bale chamber 26. The bale chamber 26 is additionally formed by an endless compaction means, which according to the present embodiment is made as two adjacent forming belts 34 and is guided around a number of fixed rollers 36, 38, 40, and movable rollers 44, 42, 46, 48, 50, 52, 54, 56. The forming belt 34 has an outer side 34a turned toward the frame 12 and an inner side 34b.

While the bale chamber 26 is essentially surrounded on all sides by the forming belt 34 and the rollers 28, 30, and 32, it is laterally delimited by side walls 57. In FIG. 1, only the side wall 57 that is on the left in the forward direction of travel V is represented.

Four rollers (50, 52, 54, 56) of the movable rollers 44-56 are mounted freely rotatable in a lower region 58 of a delta-shaped carrier 60, which is hinged at its upper vertex 62 about an axis 64 that runs horizontally and transverse to the forward direction of travel V and can be brought by means of an actuator (not shown) from the bale-forming position shown in FIG. 1 to a bale-ejection position that is swiveled to the rear and upward.

A tensioning mechanism 66 for tightening the forming belt 34 has a tensioning lever 68, which interacts with a first tensioning element (not shown) and a tensioning arm 72, which interacts with a second tensioning element 70. Both tensioning elements can be designed as a mechanical spring or a hydraulic motor or can have such a spring or motor.

The tensioning lever 68 is mounted in the region of the side wall 57 on an axle 74 that runs horizontally and transverse to the forward direction and it carries, in an end region 76 turned away from the axle 74, two of the movable rollers 46, 48, and the cleaning rollers 46a, 48a that are associated with said rollers 46, 48. The tensioning arm 72 is correspondingly mounted on an axle 78 and carries in an end region 80 one of the movable rollers 44. Moreover, the tensioning arm 68 is effectively connected at one end with the tensioning element 70, which is connected at the other end with the round baler 10 or its frame 12 in a manner not shown.

The forming belt 34 is always laid out on the driven, fixed roller 38 so firmly by means of the tensioning arm 70 that its carry-along is guaranteed. The roller 36 is also rotatably driven. The forming belt 34 assumes an initial state in which it is stretched directly across the inlet 24, and an end state in which it encircles a bale like a large sling. The bale chamber 26 is thus variable in size, i.e., its diameter increases with the size of the bale 18. During its formation, the bale is situated in the bale chamber 26 and for the most part is encircled by the forming belt 34, but it falls out of the bale chamber 26 to the rear onto the ground 16 as soon as the carrier 60 with the movable rollers 50-56 pivots counterclockwise upward (as shown). Alternatively, the bale can also be deposited on an apparatus connected to the baler 10, for example, in the form of an apparatus for wrapping the bale with a net or film material.

The embodiment of the baler that is shown is disclosed in detail in EP 1 308 078 A1. Other possible embodiments are described in DE 198 51 470 A1, DE 102 41 215 A1 and EP 1 264 531 A1. The disclosures of these documents are incorporated by reference herein.

In a region 82 of the baler 10 that is turned toward the shaft 20, a sensor device 84 is provided in order to detect a change of position directly at the forming belt 34. The sensor device 84 has a frame part forming a transverse carrier 86, which extends over the entire width on the side that is in front in the forward direction of travel V of the baler 10 between the side walls 57 and is attached to frame 12, e.g., it is bolted or welded to it.

Figure 3:
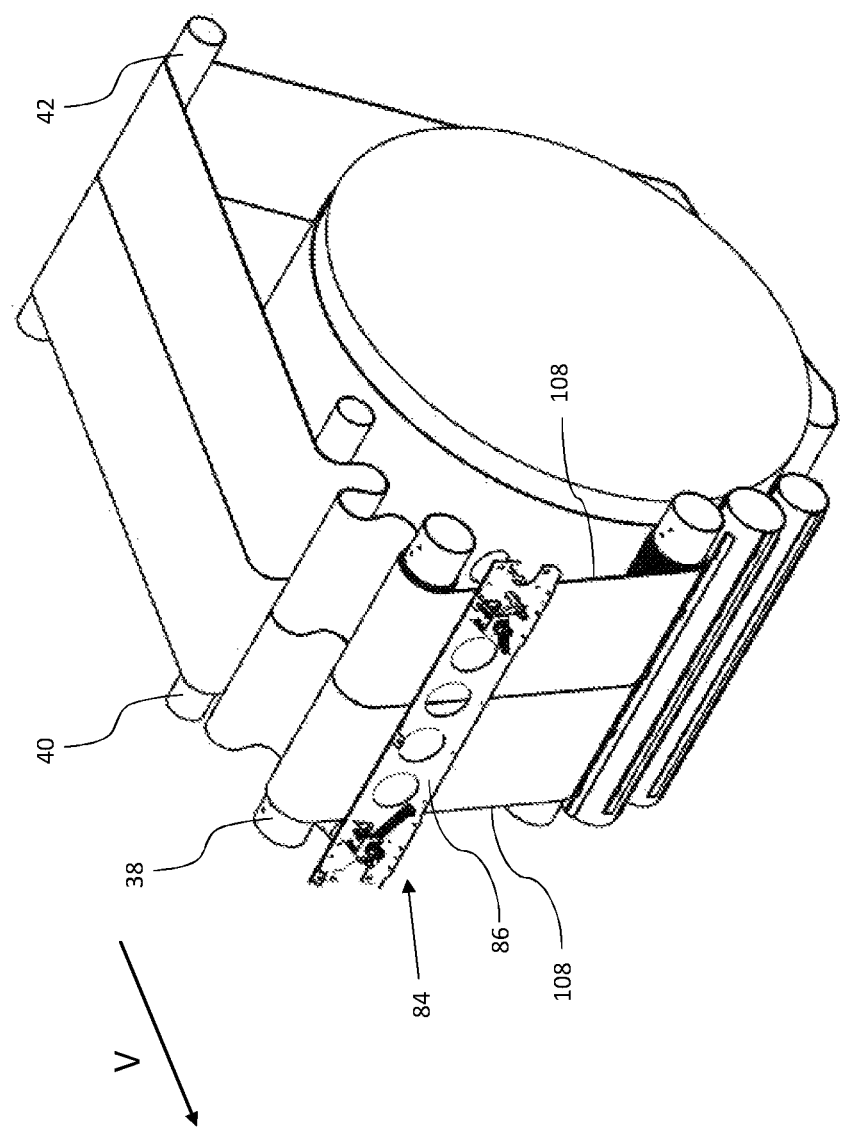
FIG. 3 shows a schematic perspective view of the forming belt arrangement with the sensor device of the round baler of FIG. 2.
Figure 4:
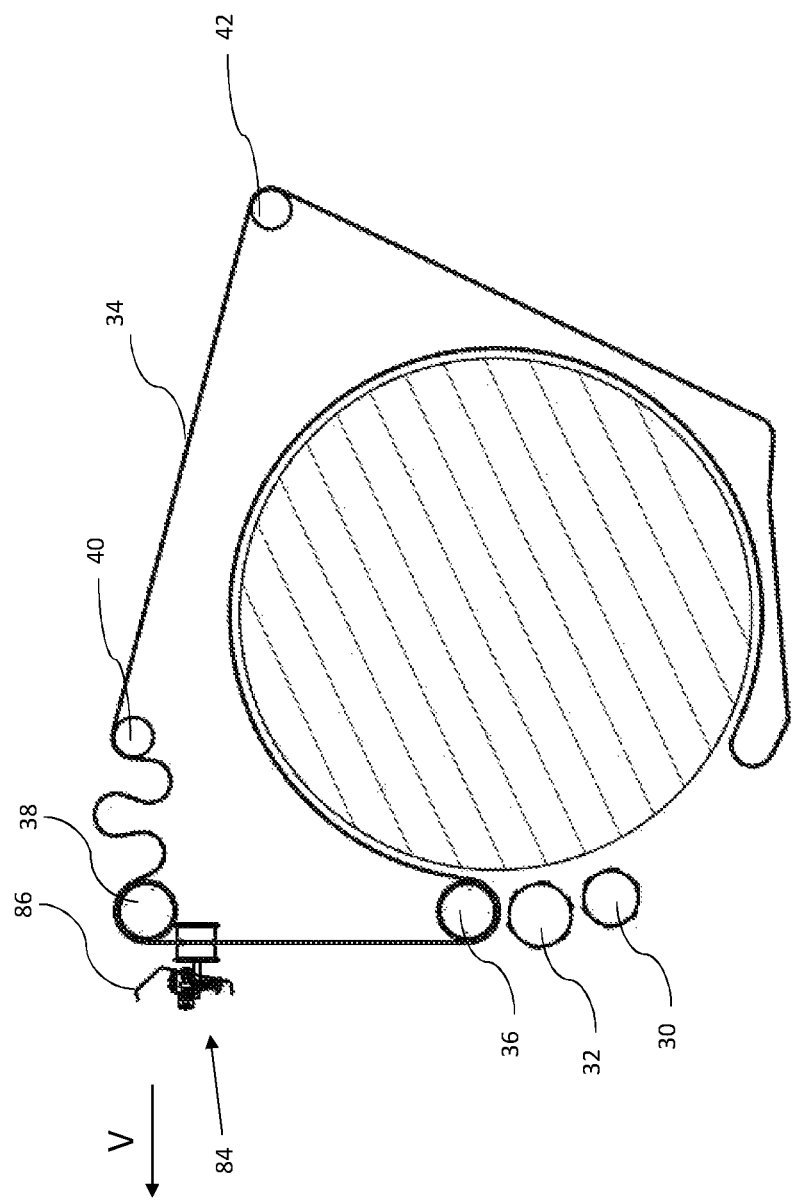
FIG. 4 shows a schematic side view of the forming belt arrangement with the sensor device of the round baler of FIGS. 2 and 3.
Figure 5:
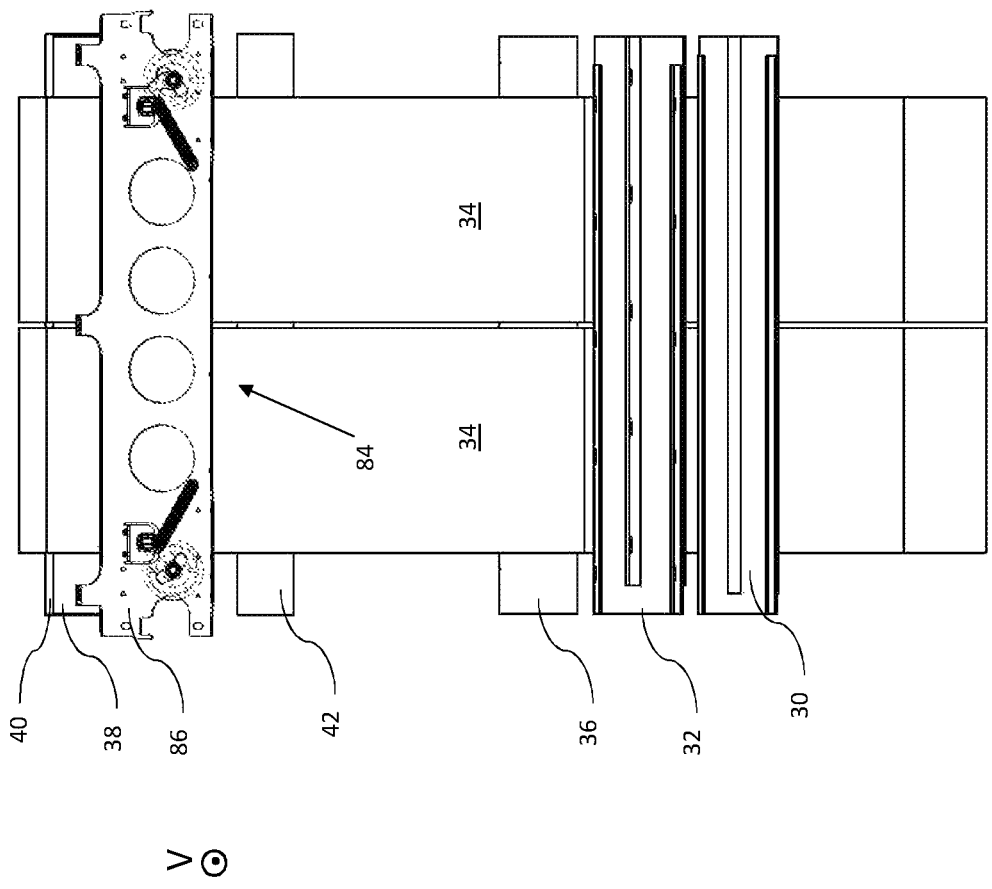
FIG. 5 shows a schematic view of a side of the forming belt arrangement with the sensor device that is in front in a forward direction of travel of the round baler of FIGS. 2 to 4.

Referring to FIGS. 3 to 11, the sensor device 84 is represented more precisely. As can be seen in FIGS. 3-5, the transverse carrier 86 extends in an upper part of the region 82 of the baler that is turned toward the shaft 20, where the transverse carrier 86 is arranged so that the forming belt 34 runs between the transverse carrier 86 and the roller 38, thus on the side of the transverse carrier 86 that is to the rear in the forward direction of travel V. The transverse carrier 86 is made as a profiled sheet in order to provide a certain stiffness. A mounting bracket 88 is provided on each of the right and left sides of the transverse carrier 86 in the lateral position to the edge regions of the forming belt 34 that are turned toward the side walls 57 and on the front side in the forward direction of travel V (see FIG. 9). A sensor mount 90 bent into a U-shape with two downward extending legs 92, 94 is screwed to each of the mounting brackets 88. Between the legs 92, 94 of the sensor mount 90, there extends essentially perpendicular to the surface of the forming belt 34 a pivot bolt 96, which is rotatably mounted on the relevant legs 92, 94. In each case an angle sensor 98 is disposed on the side of the pivot bolt 96 that is turned away from the forming belt 34.

Figure 8:
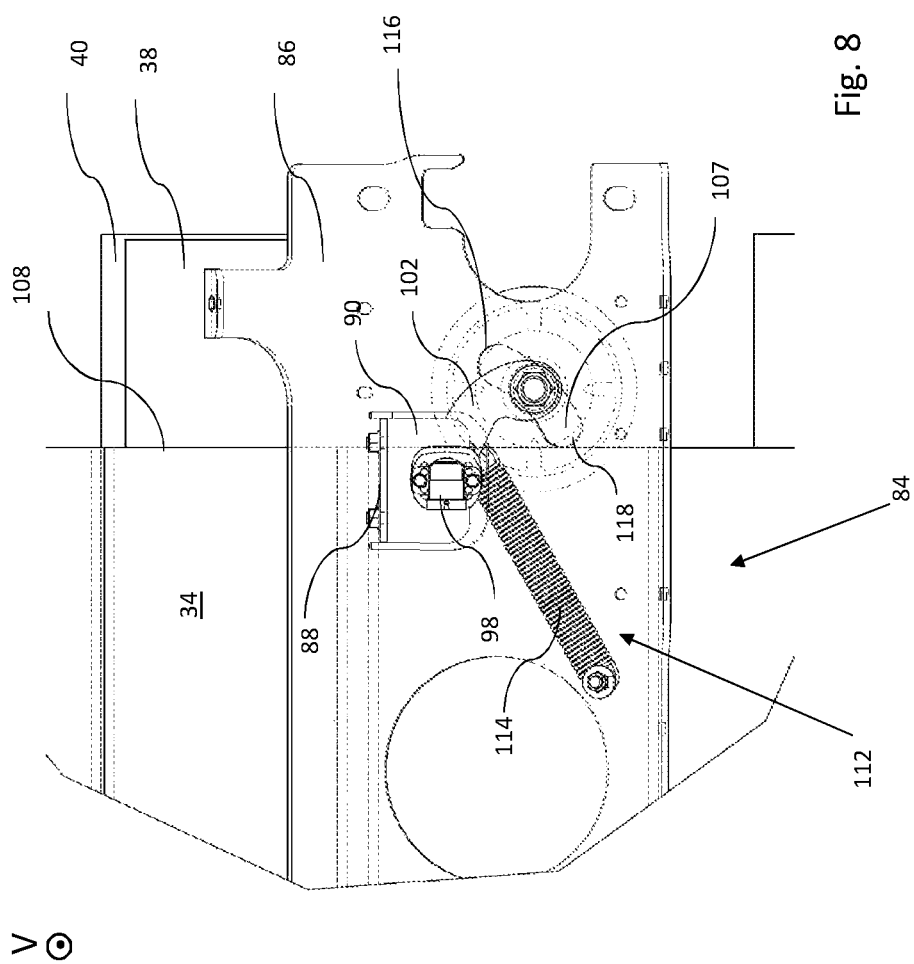
FIG. 8 shows a schematic view of a side of a left part of the sensor device of FIGS. 2 to 7 that is in front in the forward direction of travel and in a normal position of the forming belt.
Figure 9:
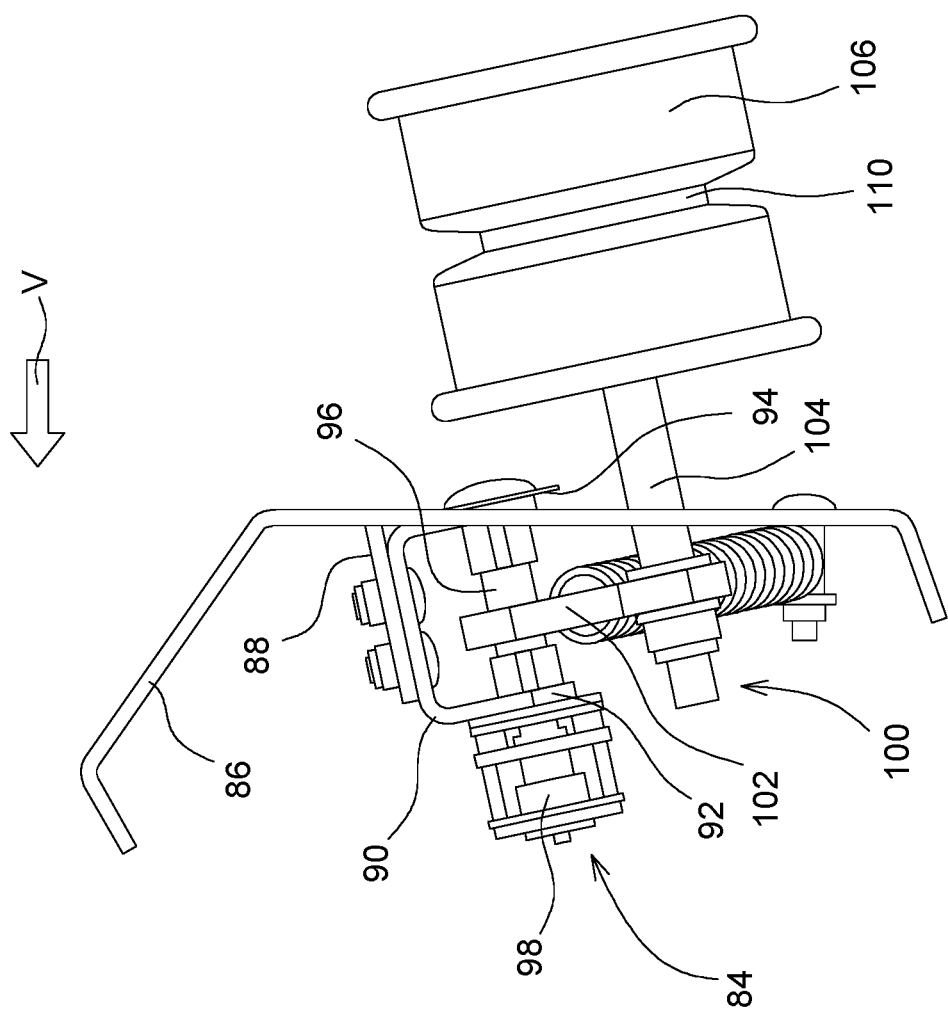
FIG. 9 shows a schematic view of a side of the left part of the sensor device of FIGS. 2 to 8 that is in front in the forward direction of travel.
Figure 10:
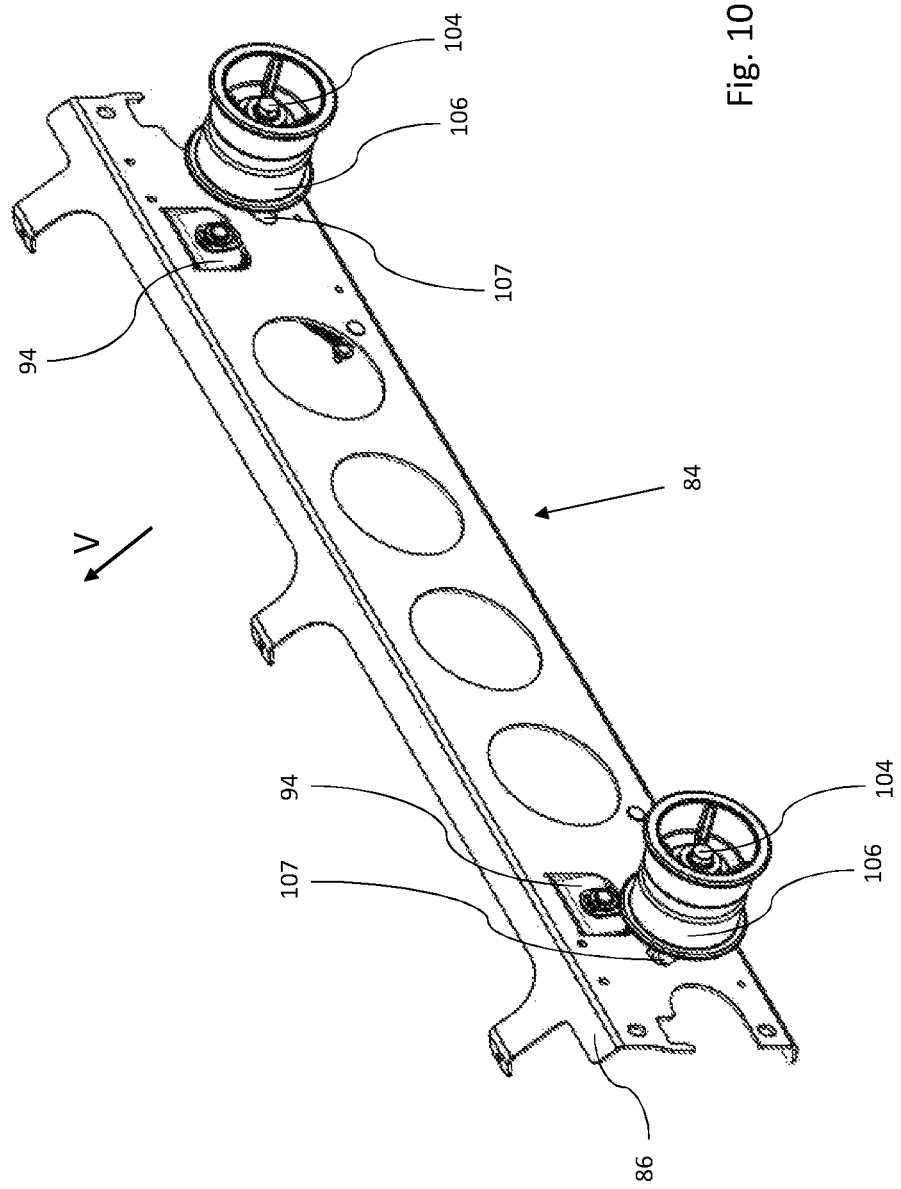
FIG. 10 shows a schematic perspective view of a side of the sensor device of FIGS. 2 to 9 that is in the rear in the forward direction of travel.
Figure 11:
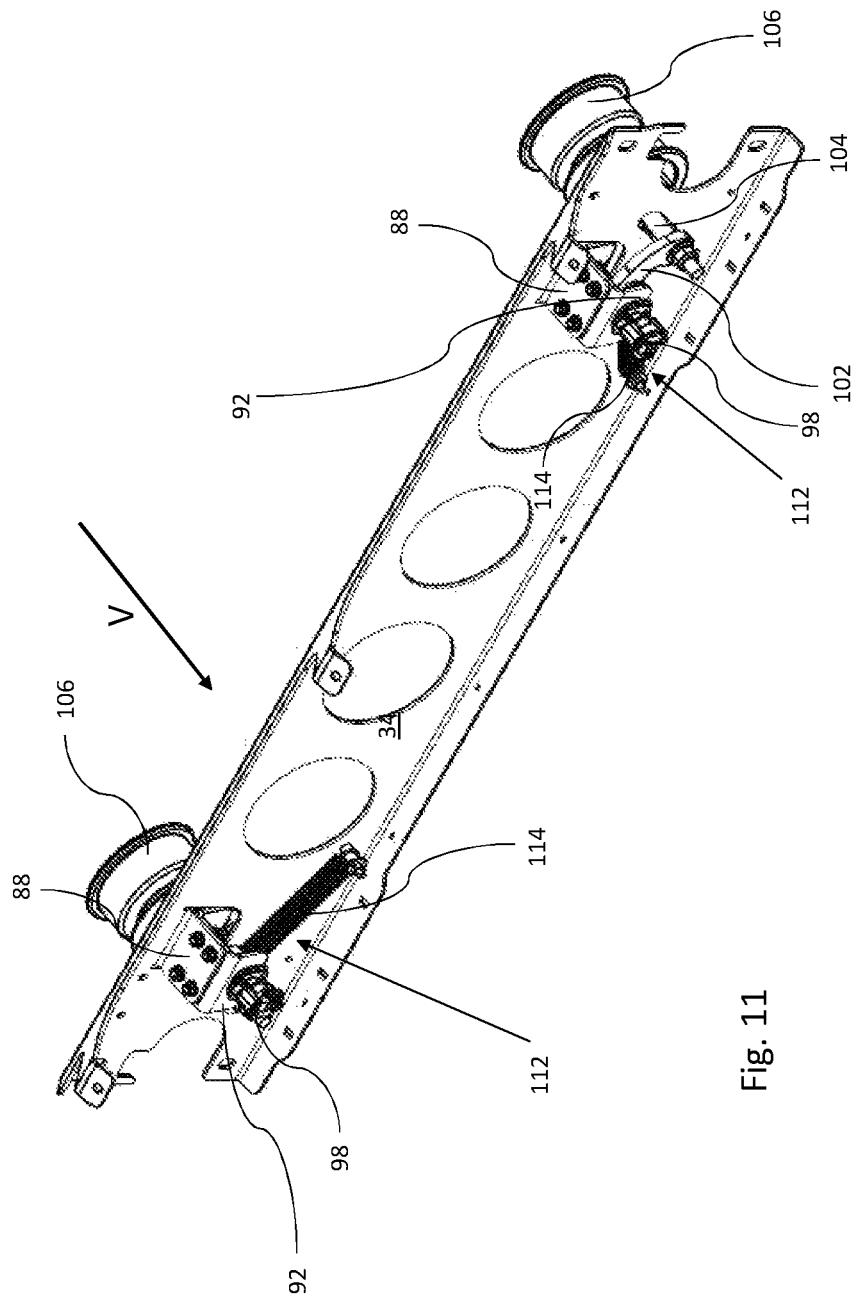
FIG. 11 shows a schematic perspective view of a side of the sensor device of FIGS. 2 to 10 that is in front in the forward direction of travel.

The pivot bolt 96 is non-rotatably connected to an actuation element 100, where the actuation element 100 comprises a pivot arm 102 which is connected non-rotatably at one end to the pivot bolt 96. The actuation element 100 further comprises a guide axle 104 and a guide roller 106, where the guide axle 104 is attached to the side of the transverse carrier 86 that is in front in the forward direction of travel at the other end of the pivot arm 102 and holds the guide roller 106 so that it can rotate. As can be seen in FIG. 9, the guide axle 104 extends from pivot arm 102 through the transverse carrier 86 and is guided in an arc-shaped guide slot 107 in a transverse carrier 86 transverse to its lengthwise axis, as shown in FIG. 8.

The guide roller 106 is rotatably mounted at the free end of the guide axle 104 on the side of the transverse carrier 86 that is at the rear in the forward direction of travel. The lateral arrangement and the relevant dimensions of the mounting bracket 88 on transverse carrier 86, the sensor mount 90, and the actuation element 100 are envisioned such that the relevant guide rollers 106 are each in engagement with one of the circulating edges 108 of the forming belt 34 that is turned toward the side walls 57. On the guide rollers 106, an annular guide groove 110 is formed in which the forming belt 34 is guided and with which the guide roller 106 rolls on the edge 108 of the relevant forming belt 34.

In order to exert a certain pressure from the guide roller 106 on the edge of the forming belt 34, a tensioning device 112 is provided where the tensioning device 112 comprises a tensioning spring 114, which is attached at one end to pivot arm 102 between pivot bolt 96 and guide axle 104, and at the other end to the transverse carrier 86 so that tensioning of the pivot arm 102 in the direction of the forming belt 34 takes place.

The sensor device 84 further has, for the pivot arm 102, a first stop 116 which is formed by an end of the arc-shaped guide slot 107 that is turned toward the relevant side wall 57, and a second stop 118 which is formed by an end of the arc-shaped guide slot 107 that is turned away from the relevant side wall 57. A change of position of the forming belt 34 in the direction of the side wall 57 is limited by the stops 116, 118, where each pivot arm 102, upon reaching the stops 116, 118, takes an extreme position and a further change of position of the forming belt 34 in the direction of the side wall 57 is prevented or blocked. Through this, the forming belt 34, with its circulating edge 108, can be effectively prevented from coming into contact with the side walls 57 and unnoticeably wearing or even being damaged.

Figure 6:
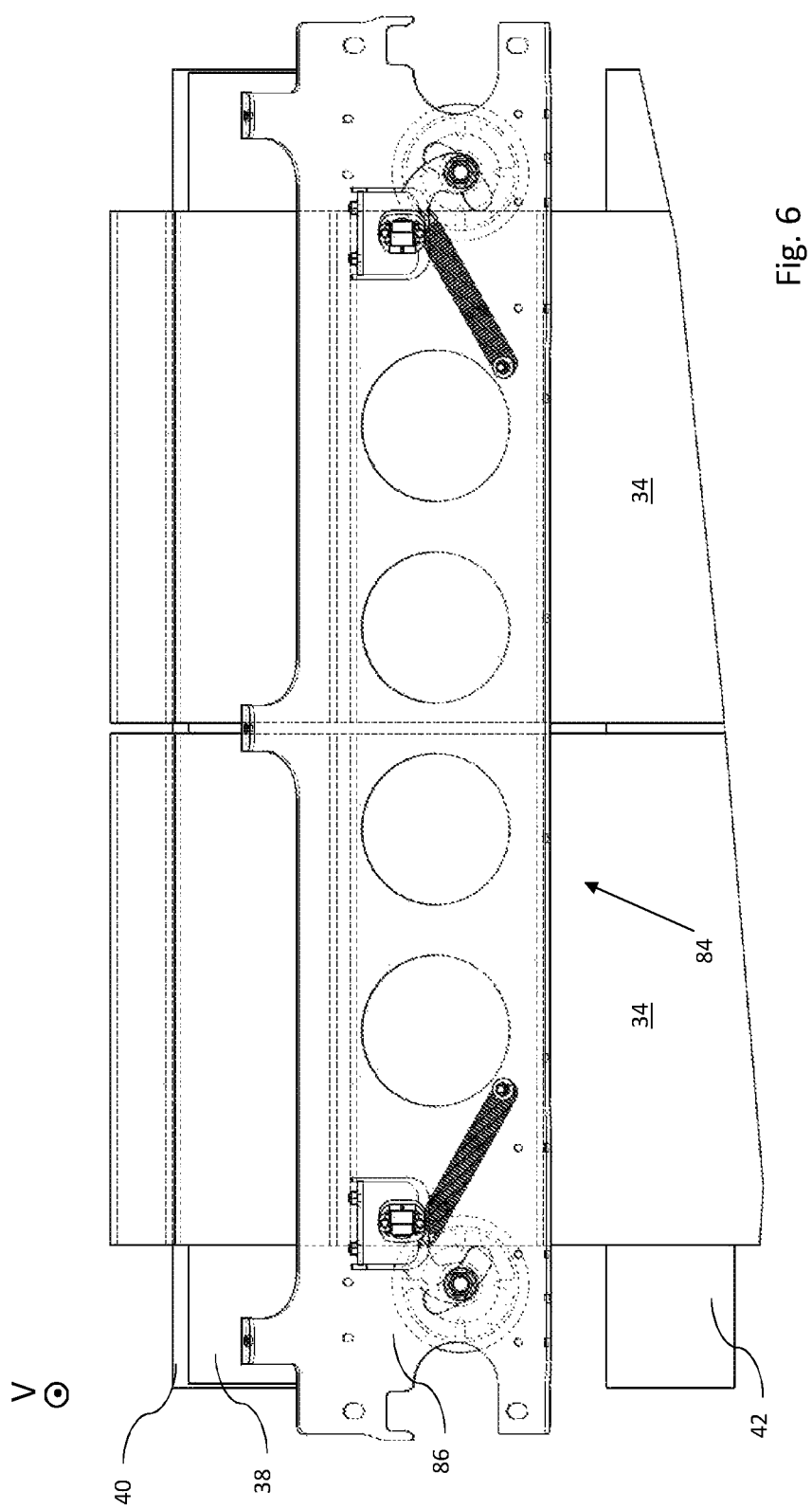
FIG. 6 shows a schematic view of a side of the sensor device of FIGS. 2 to 5 that is in front in the forward direction of travel and in a normal position of the forming belt.
Figure 7:
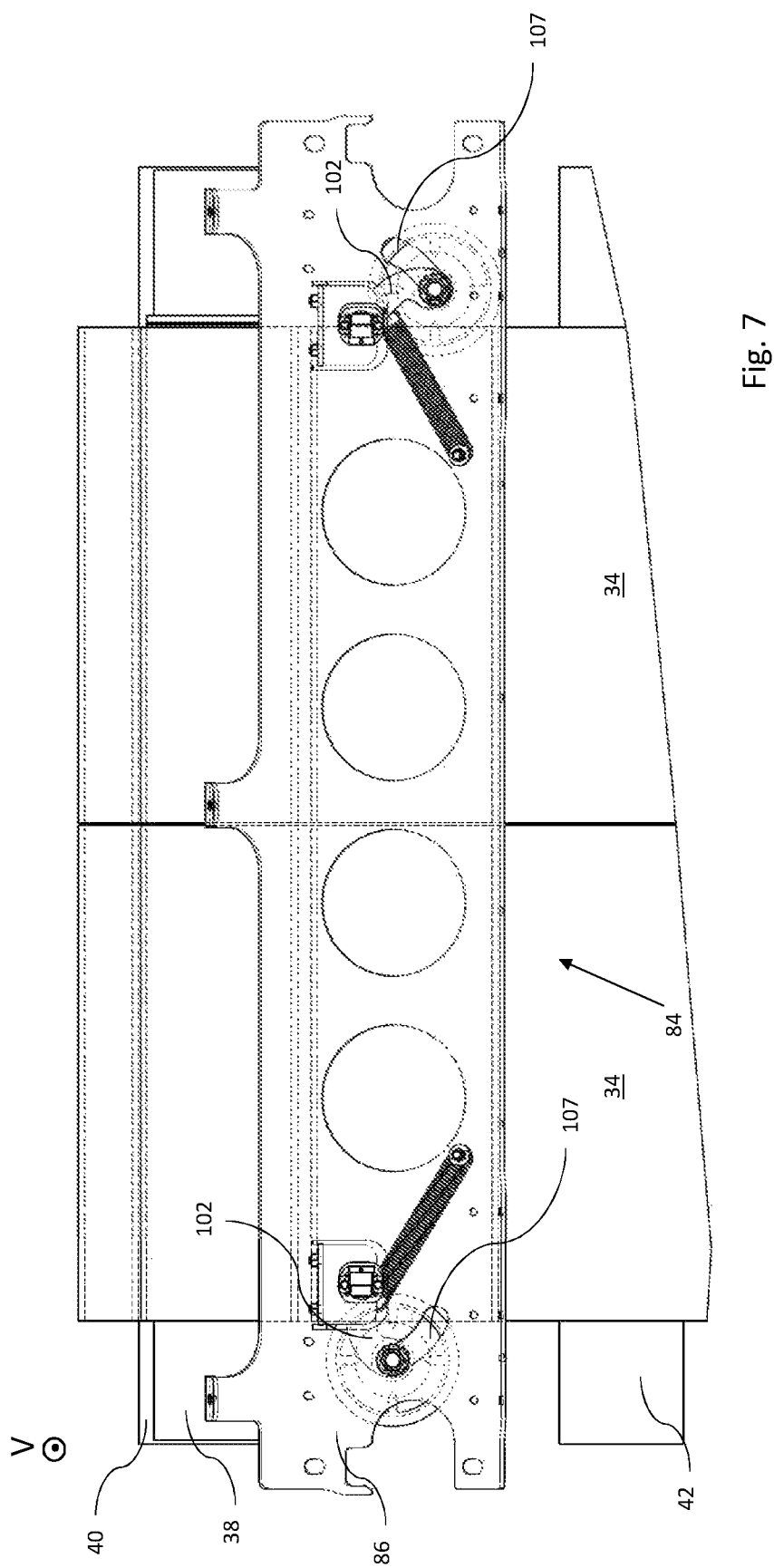
FIG. 7 shows a schematic view of a side of the sensor device of FIGS. 2 to 6 that is in front in the forward direction of travel and in a lateral position of the forming belt.

If there is a change in a position of the forming belt 34 in a direction of the side wall 57, i.e., in either a direction toward the side wall 57 or a direction away from the side wall 57, a pivoting movement of the pivot lever takes place due to the circulating edges 108 coming into engagement with the guide rollers 106, as a comparison of FIGS. 6 and 7 shows. FIG. 6 shows a normal position of the forming belt 34, in which the forming belt or belts 34 are centered between the side walls 57 and the pivot arm 102 on both sides of the transverse carrier 86 and is guided to a central position in the relevant arc-shaped guide slot 107. In contrast, FIG. 7 shows a lateral position of the forming belt 34, in which the forming belt or belts 34 have wandered or drifted laterally and have left the normal position in the direction of the side wall 57 that is on the right relative to the forward direction of travel. Here, the pivot arm 102 on the right side of the transverse carrier 86 in the forward direction of travel runs against a stop 116 and the pivot arm 102 on the left side of the transverse carrier 86 in the forward direction of travel runs against the stop 118.

For a change of position in the opposite direction, a corresponding situation with reversed combination of stops arises. The pivoting movement produced by the pivot arms 102 upon a change of position of the forming belt 34 is detected by the angle sensor 98 and sent to a signal processing unit (not shown) on the vehicle or the baler. From there the sensor signal goes to a display unit or display device 140 in the vehicle 8 in a manner known to one skilled in the art and can be displayed there visually or audibly. Furthermore, an appropriate signal processing also enables the use in an automatic steering system 142, so that depending on the sensor signal or signals, a vehicle steering that counteracts the change of position of the forming belt 34 is initiated. Such steering systems 142 or (vehicle) steering systems 142 are already widely known and are already in use in connection with global positioning systems (GPS) or mapping systems for automatic steering of agricultural vehicles. The implementation and development of the present disclosure for use of the sensor signal provided here for an autonomous steering or control of the vehicle 8 lies in the area of the general knowledge of one skilled in the art and does not need further detailed explanation.

Figure 12:
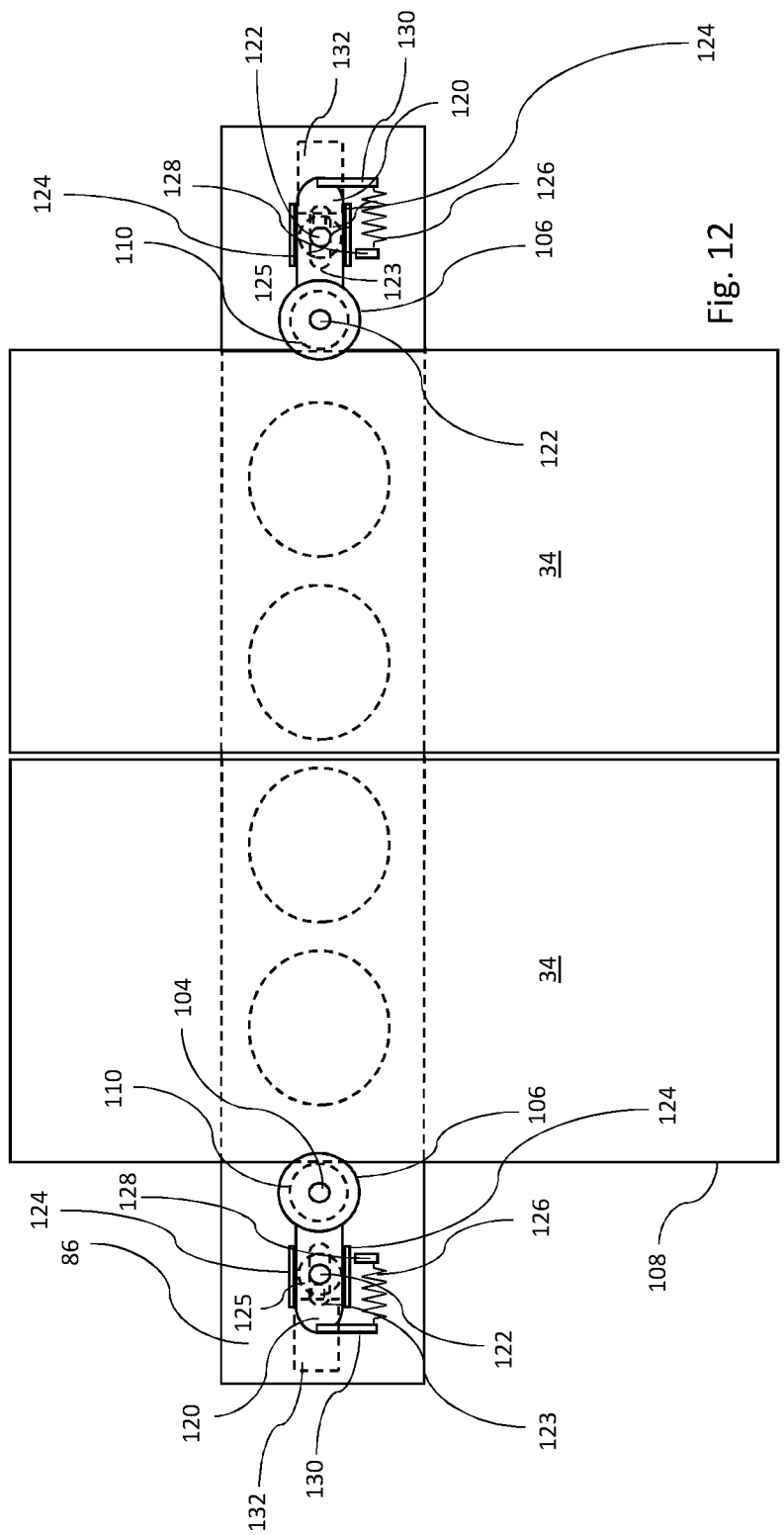
FIG. 12 shows a schematic view of a side of an alternative embodiment of a sensor device that is in the rear in the forward direction of travel and in a normal position of the forming belt.

FIG. 12 shows an alternative embodiment, which is characterized in that instead of the pivot arms 102, linearly moving slides 120 (or sliders) that are guided via a guide bolt 122 are guided in a linear guide slot 123. The slide 120 is further guided over two parallel guide rails 124 formed on transverse carrier 86 and over a guide disk 125 connected to the guide bolt. The guide rollers 106 are attached to the slide roller 120 and are in engagement with the relevant circulating edge 108, as described above. A tensioning spring 126 extends between a mount 128 on the transverse carrier 86 and a mount 130 on slide 120 and serves as a tensioning device. A travel sensor 132 is connected to the guide bolt 122 and, if the slide 120 shifts due to a change of position of the forming belt 34, provides a signal which is proportional to the change of position of the forming belt 34. The linear guide slots 124 made here form, with their ends, stops that are comparable to the stops 116 and 118 described above, where here the relevant guide bolt 122 runs against an end of the guide slot 124 and a further change of position of the forming belt 34 is prevented or blocked.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A round baler comprising:
   a frame;
   a variable bale chamber delimited by a side wall arranged on a left side or a right side relative to a direction of travel;
   a forming belt circulating adjacent the side wall and having an outer circulating edge;
   a carrier coupled to the frame and extending across a width of the variable bale chamber, wherein the carrier defines a guide slot;
   a sensor attached to the carrier;
   an arm having a first end coupled to the sensor and extending to a distal second end, wherein the sensor is operable to sense a movement of the arm relative to the carrier;
   a guide axle attached to the second end of the arm and engaged with the guide slot;
   a guide roller attached to the guide axle and rotatably engaged with the outer circulating edge of the forming belt;
   wherein the guide roller is moveable with the forming belt toward or away from the side wall in response to movement of the forming belt toward or away from the side wall, whereby the guide axle moves within the guide slot with the movement of the guide roller toward or away from the side wall thereby causing the arm to move relative to the carrier; and
   wherein the sensor is operable to detect movement of the arm relative to the carrier and output a signal indicating a relative position of the arm, in response to movement of the forming belt toward or away from the side wall.

2. The round baler set forth in claim 1, wherein the guide slot defines a first stop and a second stop at respective ends thereof, with the guide axle moveable within the guide slot between the first stop and the second stop.

3. The round baler set forth in claim 1, wherein the guide axle extends through the guide slot, such that the guide roller and the arm are disposed on opposing sides of the carrier.

4. The round baler set forth in claim 1, wherein the guide slot includes an arcuate shape.

5. The round baler set forth in claim 1, further comprising a spring interconnecting the carrier and the arm, and operable to bias the arm toward the forming belt.

6. The round baler set forth in claim 1, wherein the guide roller includes an annular guide groove for engaging the outer circulating edge of the forming belt.

7. The round baler set forth in claim 1, wherein the arm rotates relative to the sensor.

8. The round baler set forth in claim 7, wherein the sensor includes a rotary sensor operable to sense a rotational movement of the arm relative to the carrier.

* * * * *